R. F. JOHNSON.
D-HANDLE MACHINE.
APPLICATION FILED OCT. 11, 1913.
1,096,173.
Patented May 12, 1914.
2 SHEETS—SHEET 1.
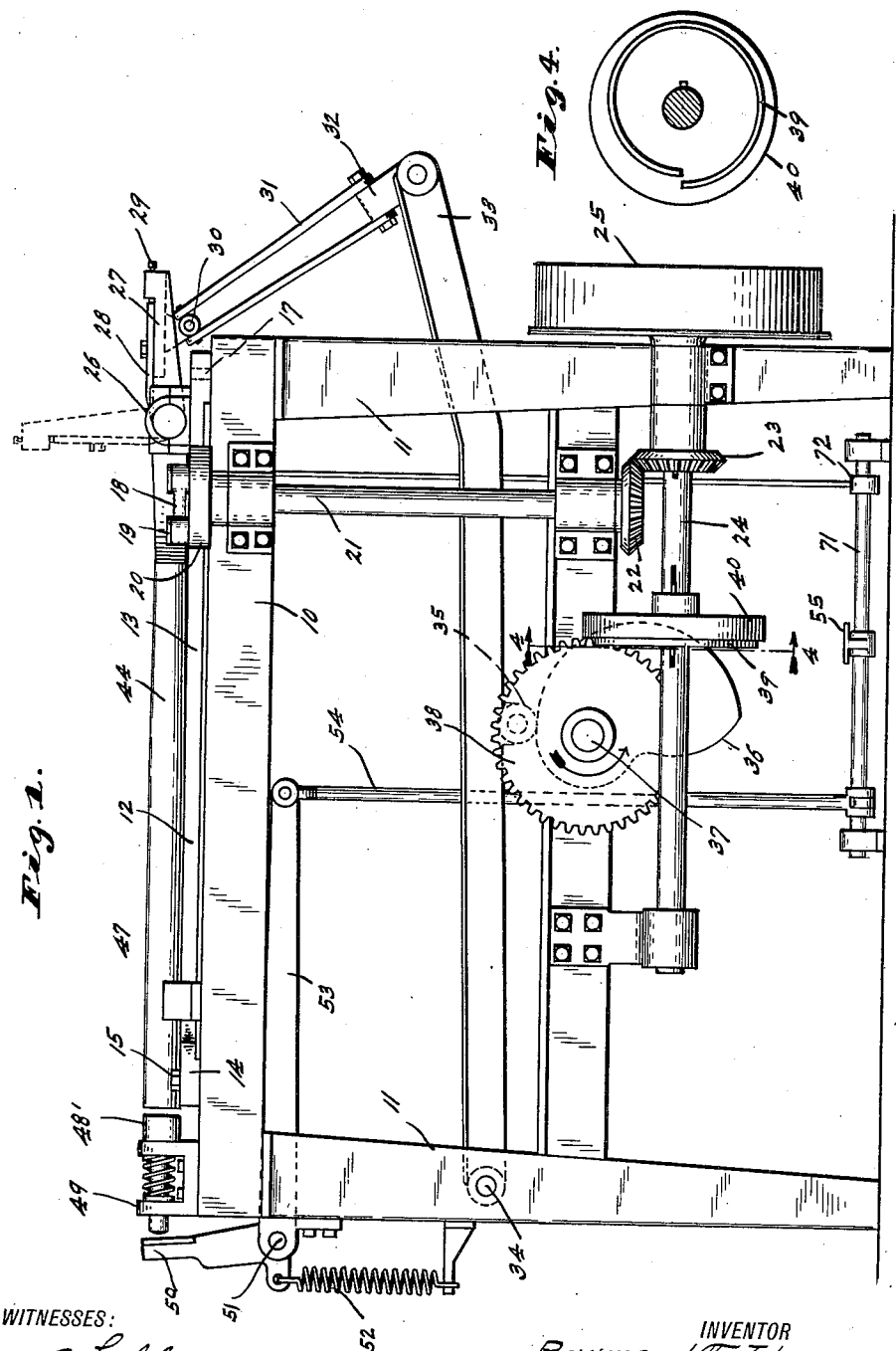
WITNESSES:
Frank A. Fahle
Josephine Gasper
INVENTOR
Raymond F. Johnson,
BY
Arthur M. Hood
ATTORNEY

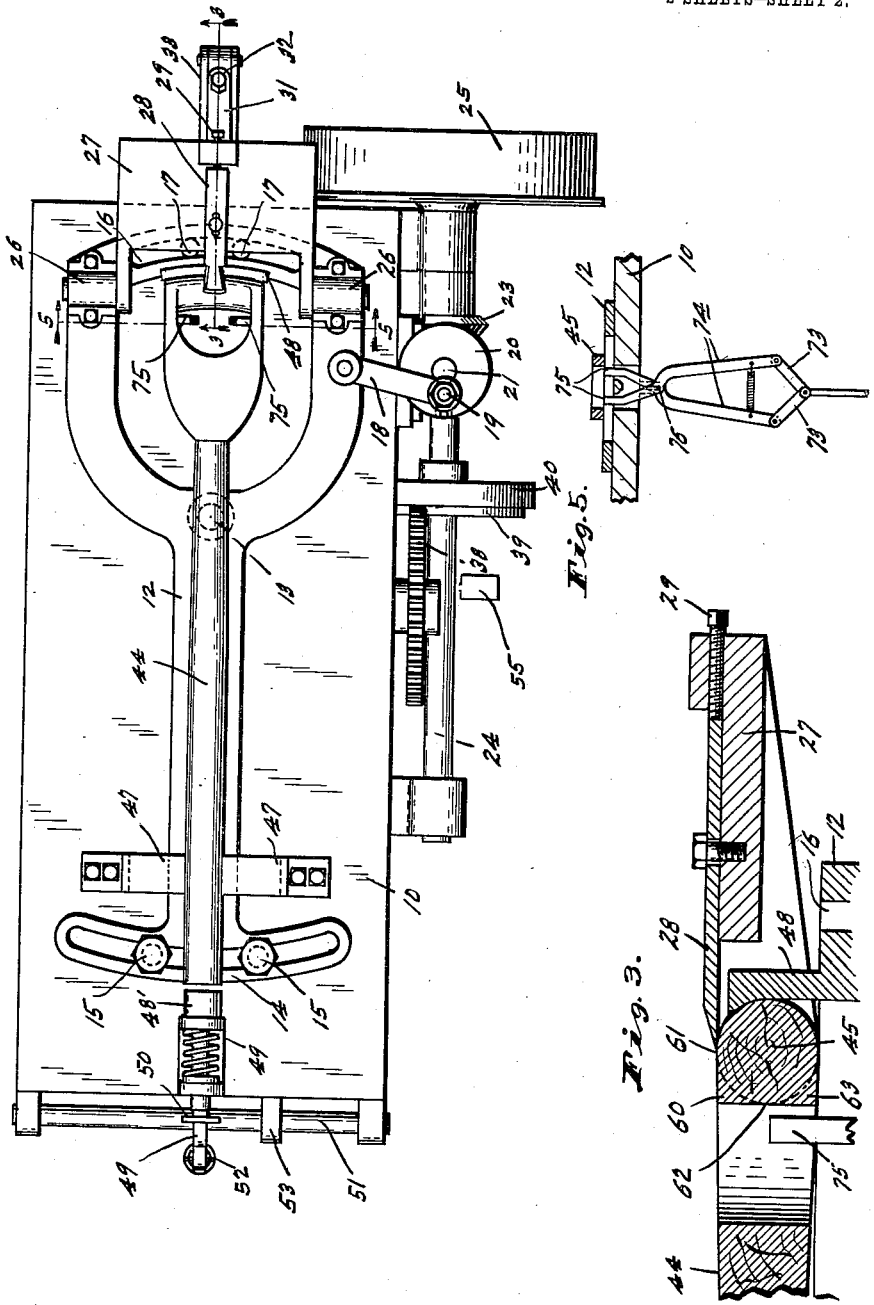

UNITED STATES PATENT OFFICE.

RAYMOND F. JOHNSON, OF PARIS, TEXAS.

D-HANDLE MACHINE.

1,096,173.  Specification of Letters Patent.  Patented May 12, 1914.

Application filed October 11, 1913. Serial No. 794,572.

*To all whom it may concern:*

Be it known that I, RAYMOND F. JOHNSON, a citizen of the United States, residing at Paris, in the county of Lamar and State of Texas, have invented a new and useful D-Handle Machine, of which the following is a specification.

It is the object of my invention to provide a machine for forming the inside round portions of the grips of D-handles, which machine will operate continuously without requiring to be stopped to change the handle being operated on, will set the pace for the workman, and will form a smooth inner part for such grip rapidly.

The accompanying drawings illustrate my invention.

Figure 1 is a side elevation of a machine embodying my invention; Fig. 2 is a plan view of such machine; Fig. 3 is an enlarged section on the line 3—3 of Fig. 2, showing the cutter in operating position on a handle; Fig. 4 is a section on the line 4—4 of Fig. 1, showing the scroll gear and Fig. 5 a section on line 5—5 of Fig. 2.

On the main frame or table 10, conveniently supported by legs 11, a Y-shaped member 12 is pivotally mounted on a vertical pivot pin 13. The base of the stem of the Y of such member is conveniently provided with a slotted arc-shaped segment 14 through which project headed stationary studs 15 for guiding and steadying such member. The ends of the arms of such member are connected by a slotted arc-shaped segment 16 through which project guiding stationary studs 17. The arcs on which the slots in the segments 14 and 16 are formed have the pivot pin 13 for their center. The Y-shaped member 12 is connected by a pitman 18 to an eccentric pin 19 adjustable radially on a disk 20 carried by the upper end of a vertical shaft 21 connected by bevel gears 22 and 23 to a main horizontal driving shaft 24, driven in any suitable manner as by a pulley 25. Rotation of the shaft 24 thus produces reciprocation of the member 12 above its pivot.

The ends of the arms of the Y of the member are provided with bearings 26 for pivotally supporting a knife-holder 27 so that the latter can swing about a horizontal axis. The knife holder 27 carries a knife 28 which at its working end is sharpened at both the end and the sides, as shown in Fig. 2, said knife 28 being adjustable by means of a screw 29 or other convenient means. The knife holder 27 is connected by a universal joint 30 to a link or pair of links 31, in turn connected by a universal joint 32 to the end of a lever 33 movable in a vertical plane about a pivot pin 34 on the legs 11. The lever 33 is provided at an intermediate point with a roller 35, which coöperates with a cam 36 fixed on a horizontal shaft 37 extending transversely to the shaft 24, said shaft 37 also carrying a gear 38 the teeth of which mesh with the spiral hoop 39 on a scroll gear 40 fixed on the main driving shaft 24. The ends of the spiral 39 are shown spaced apart the pitch of one tooth of the gear 38, though they may be spaced apart any multiple of such pitch. By this arrangement, each rotation of the driving shaft 24 and the scroll gear 40 advances the gear 38 forward by one or more teeth, and in the rotation of the gear 38 the lever 33 is lifted from its lowermost to its uppermost position, and then allowed to return to its lowermost position and remain there for a time, the full and dotted line positions of the knife holder 27 in Fig. 1 corresponding to the lowermost and uppermost positions of the lever 33.

The handle 44, of which the inner part of the grip 45 is to be rounded by the machine, is held in proper place by means of a fixed stop 48 and a clamping plunger 48′ mounted in a bracket 49 on the top of frame 10 and spring-pressed away from the end of the handle. An arm 50, carried by a rock shaft 51, is normally held away from plunger 48 by spring 52 and is moved into engagement of the plunger by lever 53, link 54, and foot treadle 55. The foot treadle 55 is carried by a shaft 71 which carries an arm 72 connected to toggle links 73, 73 which are pivoted to the arms 74, 74 of the pair of centering fingers 75, 75 which are carried by a vertical sliding pivot pin 76, the arrangement being such that depression of foot treadle 55 operates to broach fingers 75 upwardly through the top of frame 10 and into the D-shaped hole of the handle 44.

The shaft 31 is in continual operation, and reciprocates the Y-shaped member 12 back and forth around its pivot pin 13 continuously, through the bevel gears 22 and 23, the vertical shaft 21, the eccentric pin 19, and the pitman 18. The universal joints 30 and 32 prevent this reciprocation from being interfered with by the lever 33. The rotation of the shaft 24 also drives the shaft 37, though the rotation of the latter is comparatively slow since the gear 38 advances but one tooth for each reciprocation of the member 12. During the half revolution of the shaft 37 prior to bringing the parts to the position shown in Fig. 1, the workman removes one handle 44 and substitutes another, or turns over the handle being operated on so that its other side can be cut, bringing the handle to proper position by means of the pins 46, the rest 47, and the treadle 55. The speed of the machine is so timed that when the workman has gotten a handle to proper position, the parts reach the position shown in Fig. 1. As the shaft 24 continues to rotate, the cam 36 coöperates with the roller 35 to raise the free end of the arm 33, thereby tilting the knife holder 27 from the position shown in full lines to the position shown in dotted lines in Fig. 1. During all this time the knife is being reciprocated lengthwise of the grip 45 of the handle, so that as it rises the sharp end and sides of the knife 28 cut away the corner 60 by cuts which extend lengthwise of the grip 45 and gradually progress around the grip from the point 61 to the point 62. When the point 62 is reached, the highest point of the cam 36 is under the roller 35, and as the shaft 37 continues its rotation, the roller 35 is allowed to drop rather quickly to return the lever 33 to its lowermost position and the knife holder 27 to its full line position. When this full line position is reached, the workman removes the handle, and either substitutes another or turns the handle over so that the corner 63 may be rounded off similarly, the shaft 27 continuing to rotate as he is doing this to bring the parts again to the position shown in Fig. 1, when the cycle above described is repeated. It will be readily understood that the means for reciprocating the carrier 12 may be attached thereto at any desired point in its length.

I claim as my invention:

1. In a shaping machine, the combination of a table, a reciprocable member mounted thereon, a knife carried by said reciprocable member and reciprocable relatively to said member transversely to the plane of reciprocation of the latter, means for reciprocating both said member and said knife, the reciprocations of said knife being slow as compared with those of the member, and means for holding a piece to be operated on in position to be acted on by said knife as the knife and the member are reciprocated.

2. In a shaping machine, the combination of a table, a reciprocable member mounted thereon, a knife carried by said reciprocable member and reciprocable relatively to said member transversely to the plane of reciprocation of the latter, means for reciprocating both said member and said knife, and means for holding a piece to be operated on in position to be acted on by said knife as the knife and the member are reciprocated.

3. In combination, a main frame, a member pivotally mounted thereon, a knife pivotally mounted on said member on an axis transverse to the axis on which said member is mounted, means for reciprocating said member about its pivot, means for more slowly reciprocating said knife about its pivot, and means for holding a piece to be operated on so that it will be acted on by the knife as the member and the knife are moved about their pivots.

4. In combination, a main frame, a member pivotally mounted thereon, an adjustable knife pivotally mounted on said member on an axis transverse to the axis on which said member is mounted, means for reciprocating said member about its pivot, means for reciprocating said knife about its pivot, and means for holding a piece to be operated on so that it will be acted on by the knife as the member and the knife are moved about their pivots.

5. In combination, a main frame, a member pivotally mounted thereon, a knife pivotally mounted on said member on an axis transverse to the axis on which said member is mounted, means for reciprocating said member about its pivot, means for reciprocating said knife about its pivot, and means for holding a piece to be operated on so that it will be acted on by the knife as the member and the knife are moved about their pivots.

6. In combination, a frame, a member pivotally mounted thereon, a knife pivotally mounted on said member on an axis transverse to the pivot in said member, driving connections for reciprocating said member about its pivot and for more slowly reciprocating said knife about its pivot, said knife reciprocating mechanism including a cam which advances the knife through an arc and then returns it to normal and allows it to remain there for a time, and means for holding material to be operated on in position so that the knife will act on it as it and the member are reciprocated.

7. In combination, a frame, a member pivotally mounted thereon, a knife pivotally mounted on said member on an axis transverse to the pivot in said member, driving connections for reciprocating said member about its pivot and for reciprocating said knife about its pivot, said knife reciprocating mechanism including a cam which advances the knife through an arc and then returns it to normal and allows it to remain there for a time, and means for holding material to be operated on in position so that the knife will act on it as it and the member are reciprocated.

In witness whereof, I have hereunto set my hand at Paris, Texas, this 7th day of October, A. D. one thousand nine hundred and thirteen.

RAYMOND F. JOHNSON.

Witnesses:
EFFIE MARTIN DODD,
A. I. JOHNSON.